US008064770B2

(12) United States Patent
Manna

(10) Patent No.: US 8,064,770 B2
(45) Date of Patent: Nov. 22, 2011

(54) SYSTEM AND METHOD FOR SPECTRAL LOADING AN OPTICAL TRANSMISSION SYSTEM

(75) Inventor: Massimo Manna, Eatontown, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 846 days.

(21) Appl. No.: 11/202,433

(22) Filed: Aug. 11, 2005

(65) Prior Publication Data

US 2006/0051093 A1 Mar. 9, 2006

Related U.S. Application Data

(60) Provisional application No. 60/600,533, filed on Aug. 11, 2004.

(51) Int. Cl.
*H04J 14/02* (2006.01)
*H04B 10/02* (2006.01)

(52) U.S. Cl. ............................................. 398/94; 398/95

(58) Field of Classification Search .......... 398/182–201, 398/94–95
See application file for complete search history.

(56) References Cited

U.S. PATENT DOCUMENTS

| | | | | |
|---|---|---|---|---|
| 4,800,555 A | * | 1/1989 | Foschini | 398/95 |
| 5,239,548 A | * | 8/1993 | Babbitt et al. | 372/26 |
| 5,293,448 A | * | 3/1994 | Honda | 704/208 |
| 5,313,315 A | * | 5/1994 | Feinberg et al. | 359/4 |
| 5,387,992 A | * | 2/1995 | Miyazaki et al. | 398/95 |
| 5,457,562 A | * | 10/1995 | Tremblay | 398/70 |
| 5,589,970 A | * | 12/1996 | Lyu et al. | 398/95 |
| 5,886,802 A | * | 3/1999 | Majima | 398/95 |
| 5,907,420 A | * | 5/1999 | Chraplyvy et al. | 398/180 |
| 5,943,133 A | * | 8/1999 | Zeylikovich et al. | 356/496 |
| 5,999,309 A | * | 12/1999 | Jang | 359/337.21 |
| 6,008,932 A | * | 12/1999 | Luo et al. | 359/337 |
| 6,038,061 A | * | 3/2000 | Sugaya | 359/337 |
| 6,043,915 A | * | 3/2000 | Giles et al. | 398/94 |
| 6,067,187 A | * | 5/2000 | Onaka et al. | 359/337.11 |
| 6,101,014 A | * | 8/2000 | Majima | 398/69 |
| 6,108,123 A | * | 8/2000 | Kinoshita | 359/337 |

(Continued)

FOREIGN PATENT DOCUMENTS

JP 200251008 2/2002

(Continued)

OTHER PUBLICATIONS

Pilipetskii, A. et. al. "Spectral Hole Burining Simulation and Experimental Verification in Long-Haul WDM System", Optical Fiber Communications Conference, 2003. pp. 577-578 vol. 2, Mar. 23-28, 2003.*

(Continued)

*Primary Examiner* — Danny Leung
(74) *Attorney, Agent, or Firm* — Grossman, Tucker, Perreault & Pfleger, PLLC

(57) ABSTRACT

A system and method for spectral loading unutilized channels of a partially loaded WDM system may be used to suppress spectral hole burning (SHB). Dummy tones may be loaded at different loading wavelengths within the band of system wavelengths such that the loading wavelengths are associated with a subset of unutilized channels in the WDM system. The loading wavelengths may be selected and spaced based on a distortion in the gain spectrum of the partially loaded WDM system such that the dummy tones alter the distortion to provide a desired gain spectrum.

22 Claims, 6 Drawing Sheets

U.S. PATENT DOCUMENTS

| | | | | |
|---|---|---|---|---|
| 6,144,486 | A * | 11/2000 | Bennett et al. | 359/337.13 |
| 6,147,794 | A * | 11/2000 | Stentz | 359/334 |
| 6,151,157 | A * | 11/2000 | Ball et al. | 359/337.12 |
| 6,204,945 | B1 * | 3/2001 | Iwata et al. | 398/9 |
| 6,214,162 | B1 * | 4/2001 | Koshimizu | 156/345.28 |
| 6,233,076 | B1 * | 5/2001 | Iwata et al. | 398/14 |
| 6,259,555 | B1 * | 7/2001 | Meli et al. | 359/337 |
| 6,320,693 | B1 * | 11/2001 | Cereo et al. | 359/337 |
| 6,414,770 | B2 * | 7/2002 | Iwata et al. | 398/79 |
| 6,426,817 | B1 * | 7/2002 | Tomita | 398/82 |
| 6,522,803 | B1 * | 2/2003 | Nakajima et al. | 385/24 |
| 6,571,032 | B1 * | 5/2003 | Pilipetskii et al. | 385/24 |
| 6,657,776 | B2 * | 12/2003 | Gehlot | 359/334 |
| 6,658,211 | B1 * | 12/2003 | Yokoyama | 398/79 |
| 6,704,511 | B1 * | 3/2004 | Kerfoot et al. | 398/85 |
| 6,714,740 | B2 * | 3/2004 | Tajima | 398/31 |
| 6,721,507 | B2 * | 4/2004 | Iwata et al. | 398/79 |
| 6,735,394 | B1 * | 5/2004 | Yue et al. | 398/92 |
| 6,760,521 | B2 * | 7/2004 | Watanabe | 385/50 |
| 6,762,839 | B2 * | 7/2004 | Zeylikovich et al. | 356/397 |
| 6,782,205 | B2 * | 8/2004 | Trisnadi et al. | 398/94 |
| 6,810,214 | B2 * | 10/2004 | Chbat et al. | 398/160 |
| 6,819,460 | B1 * | 11/2004 | Babbitt et al. | 359/11 |
| 6,859,623 | B2 * | 2/2005 | Le Bouette et al. | 398/94 |
| 6,901,188 | B2 * | 5/2005 | Brennan, III | 385/37 |
| 6,907,195 | B2 * | 6/2005 | Yu et al. | 398/5 |
| 6,944,399 | B2 * | 9/2005 | Yu et al. | 398/5 |
| 7,177,540 | B2 * | 2/2007 | Inoue et al. | 398/16 |
| 7,233,432 | B2 * | 6/2007 | Islam et al. | 359/337 |
| 7,369,774 | B2 * | 5/2008 | Lee et al. | 398/96 |
| 7,376,355 | B2 * | 5/2008 | Ota | 398/167 |
| 2001/0015838 | A1 * | 8/2001 | Iwata et al. | 359/124 |
| 2001/0046054 | A1 * | 11/2001 | Zeylikovich et al. | 356/497 |
| 2001/0053006 | A1 * | 12/2001 | Yoshida | 359/133 |
| 2002/0041411 | A1 * | 4/2002 | Persson et al. | 359/124 |
| 2002/0105695 | A1 * | 8/2002 | DeGrange et al. | 359/127 |
| 2002/0126353 | A1 * | 9/2002 | Iwata et al. | 359/124 |
| 2002/0172146 | A1 * | 11/2002 | Wu et al. | 370/208 |
| 2003/0048508 | A1 * | 3/2003 | Yu et al. | 359/133 |
| 2003/0063353 | A1 * | 4/2003 | Hamoir | 359/181 |
| 2003/0090674 | A1 * | 5/2003 | Zeylikovich et al. | 356/497 |
| 2003/0113117 | A1 * | 6/2003 | Taneda | 398/79 |
| 2003/0180000 | A1 * | 9/2003 | Brennan, III | 385/37 |
| 2004/0047020 | A1 * | 3/2004 | Islam et al. | 359/233 |
| 2004/0096215 | A1 * | 5/2004 | Evangelides et al. | 398/33 |
| 2004/0151502 | A1 * | 8/2004 | Kerfoot et al. | 398/82 |
| 2005/0024715 | A1 * | 2/2005 | Inoue et al. | 359/337 |
| 2005/0117200 | A1 * | 6/2005 | Akiyama et al. | 359/326 |
| 2005/0152693 | A1 * | 7/2005 | Grand et al. | 398/27 |
| 2005/0213980 | A1 * | 9/2005 | Ota | 398/84 |
| 2005/0276563 | A1 * | 12/2005 | Faure et al. | 385/140 |
| 2005/0286905 | A1 * | 12/2005 | Mohs et al. | 398/160 |
| 2006/0051093 | A1 * | 3/2006 | Manna | 398/79 |
| 2006/0171717 | A1 * | 8/2006 | Kikuchi | 398/83 |
| 2008/0069572 | A1 * | 3/2008 | Ikeda et al. | 398/158 |
| 2008/0304829 | A1 * | 12/2008 | Sato | 398/79 |
| 2008/0310858 | A1 * | 12/2008 | Lu et al. | 398/158 |

FOREIGN PATENT DOCUMENTS

WO        0211338        2/2002

OTHER PUBLICATIONS

Inoue et al. "In-Service Upgrade Method for DWDM Submarine Cable System Using ASE Dummy Lights", copyrighted 2003 by Optical Society of America.*

International Search Report mailed Aug. 9, 2006 from corresponding PCT Appln. No. PCT/US05/28643.

Written Opinion mailed Aug. 9, 2006 from corresponding PCT Appln. No. PCT/US05/28643.

Pilipetskii, et al., "Spectral Hole Burning Simulation and Experimental Verification in Long-Haul WDM Systems," Thursday Afternoon, OFC 2003, vol. 2, pp. 577-558.

Inoue, et al, "In-Service Upgrade Method for DWDM Submarine Cable System Using ASE Dummy Lights," Journal of IEEE vol. 12, Issue 4, Jul.-Aug. 2006 pp. 484-496.

Japanese Notice of Grounds for Rejection dated Aug. 25, 2009 issued in related Japanese Patent Application No. 2007-525803.

Japanese Notice of Reasons for Rejection dated Jul. 13, 2010 issued in related Japanese Patent Application No. 2007-525803.

* cited by examiner

SYSTEM AND METHOD FOR SPECTRAL LOADING AN OPTICAL TRANSMISSION SYSTEM

CROSS-REFERENCE TO RELATED APPLICATIONS

This application claims the benefit of provisional application Ser. No. 60/600,533 filed Aug. 11, 2004, which is fully incorporated herein by reference.

TECHNICAL FIELD

The present invention relates to optical transmission systems, and, in particular, to a system and method for spectral loading unutilized system channels with dummy loading tones to suppress spectral hole burning (SBH).

BACKGROUND

To maximize the transmission capacity of an optical fiber transmission system, a single optical fiber may be used to carry multiple optical signals in what is called a wavelength division multiplex system (hereinafter a WDM system). Modern WDM systems have a high traffic capacity, for example, a capacity to carry 64 channels of 10 gigabits per second (hereinafter Gb/s). When an optical link is initially deployed, however, the link may be only partially loaded (e.g., ≦8 channels). Initially, only a few of the total number of potential channels may be used to carry information signals.

When the information signals are transmitted over long distances or between links of optical fiber cable, one or more amplifiers may be provided to compensate for signal attenuation. The amplifiers used in some WDM systems cannot easily be modified and may be sized initially to support a fully loaded link (e.g., 64 channels, each channel carrying 10 Gb/s). The power per channel must be sufficient to provide an adequate signal to noise ratio in the presence of the amplified spontaneous emission (ASE) noise from the amplifiers, necessitating a high amplifier total output power for systems with high fully-loaded capacity. The amplifiers are thus configured to provide an optical output signal at a nominal optical power. The nominal output power level is insensitive to the power at the input of the amplifier. As the amplifier input power varies over a wide range, the output power changes very little around this nominal output power level. Thus, when the optical link is fully loaded, each channel is amplified to a substantially equal optical output power. If the initially deployed system uses only a few channels for information, these channels share all of the amplifier output power. As additional channels are added, the optical output power per-channel decreases.

When some channel powers increase compared to other channels, problems may be caused by an effect known as spectral hole burning (SHB). In an optical communication network using rare-earth-doped fiber amplifiers, such as erbium-doped fiber amplifiers (EDFAs), signal-induced saturation in the doped fiber medium may cause SHB. As a result of SHB, a gain depression or "hole" may be induced in the gain spectrum of a WDM system in the spectral vicinity of a saturated channel. When a WDM system is loaded with low channel counts during initial deployment, for example, the system may show a severely distorted gain shape such that the channels experience a higher power evolution along the system.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
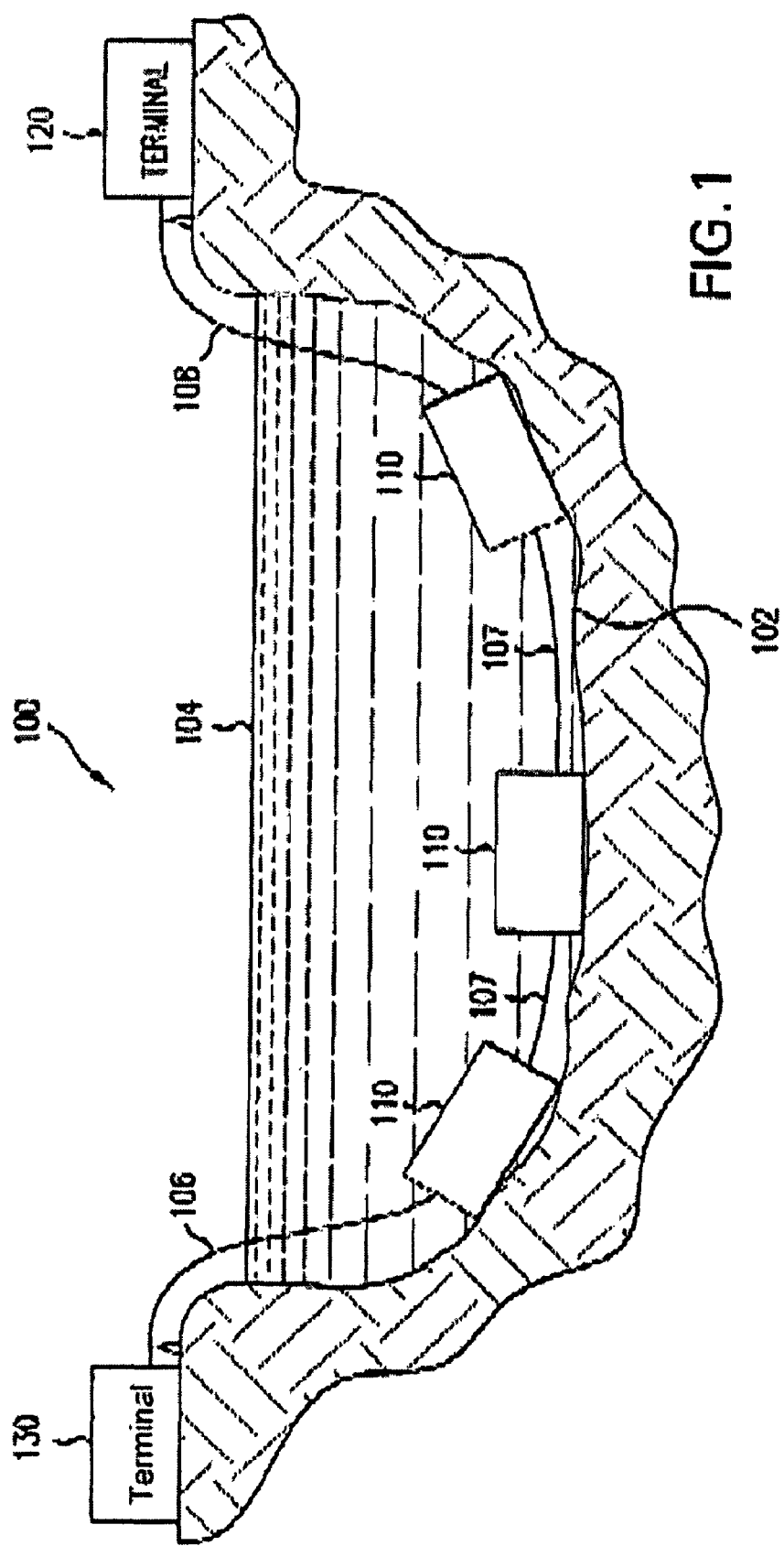
FIG. 1 is a schematic illustration of an optical communication system consistent with the present invention.

Turning now to FIG. 1, there is illustrated an exemplary optical communication system 100 consistent with the present invention. Those skilled in the art will recognize that the system 100 has been depicted as a highly simplified point-to-point system for ease of explanation. The optical communication system 100 includes terminals 120, 130 coupled to optical cables 106, 108. Optical cables 106, 108 may include a plurality of fiber pairs for carrying optical signals and may be linked through a plurality of repeaters 1 10 (including optical amplifiers) and linking optical cables 107 to provide a transmission path for bi-directional communication of optical signals between terminals 120, 130.

System 100 may be employed to span a body of water 104. When used to span a body of water, e.g. an ocean, repeaters 110 may be seated on the ocean floor 102 and the transmission path may span between beach landings. It will be appreciated that a plurality of repeater and optical media links may be disposed beneath water and/or over land.

When a system, e.g. system 100, is configured as a WDM system and initially deployed with unutilized channels, information signals on utilized channels may cause a distorted gain shape as a function of the loading configuration. As used herein, "utilized channels" shall refer to WDM system channel locations carrying traffic or information signals on the system, and "unutilized channels" shall refer to WDM system channel locations that do not contain traffic or information carrying signals.

Figure 2A:
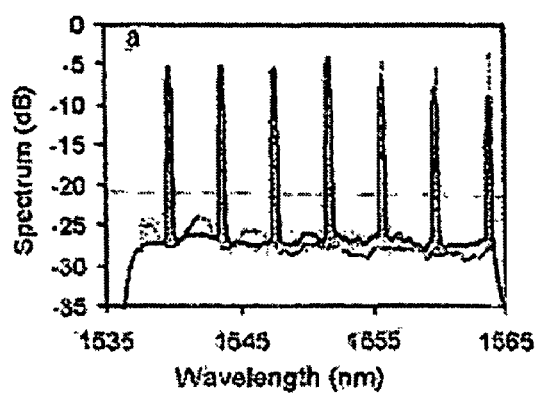
FIGS. 2A-2C are graphical illustrations of gain spectra for different loading configurations in a WDM system.
Figure 2B:
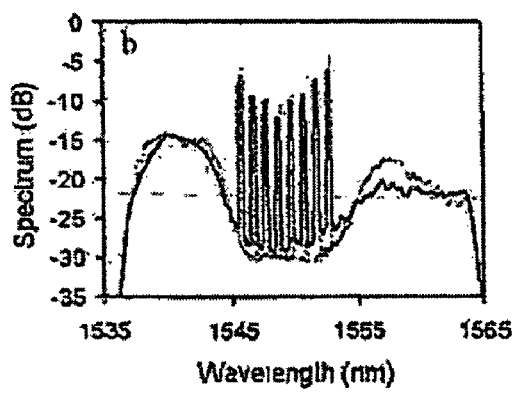
Figure 2C:
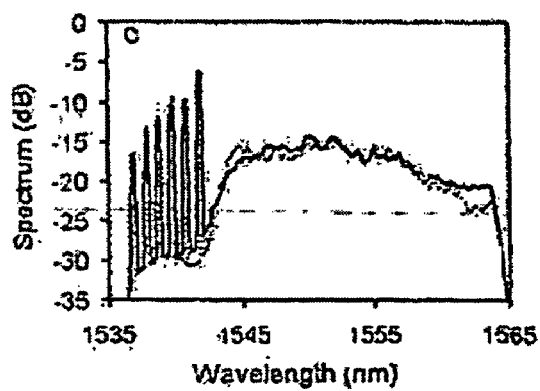

One effect that may cause a distorted gain shape is spectral hole burning (SHB). FIGS. 2A-2C illustrate examples of gain spectra for different loading configurations in an exemplary system including a 6,650 km link. FIG. 2A shows information signals on utilized channels spaced across the system band. FIG. 2B shows information signals on utilized channels concentrated at the center of the system band. FIG. 2C shows information signals on utilized channels concentrated at one end of the system band. As shown in FIGS. 2A-2C, the holes or gain depressions caused by SHB may result in distortions in the gain spectrum such that the gain spectrum is altered from the relatively flat gain spectrum for a fully loaded WDM system.

Generally, systems and methods consistent with the present invention address this issue by loading the system with dummy tones in addition to the initial information signals at the transmitter. As used herein, a dummy tone (also referred to as an idler tone) is optical energy that is centered on a specific wavelength and that does not carry information or traffic. As described in greater detail below, dummy tones may be generated by filtering noise, such as amplified spontaneous emission (ASE) noise, or by using a continuous-wave non-modulated laser source. The dummy tones may be loaded at initial loading of the system to control flattening of the spectral gain and to control the power of the utilized channels that carry traffic.

Figure 3:
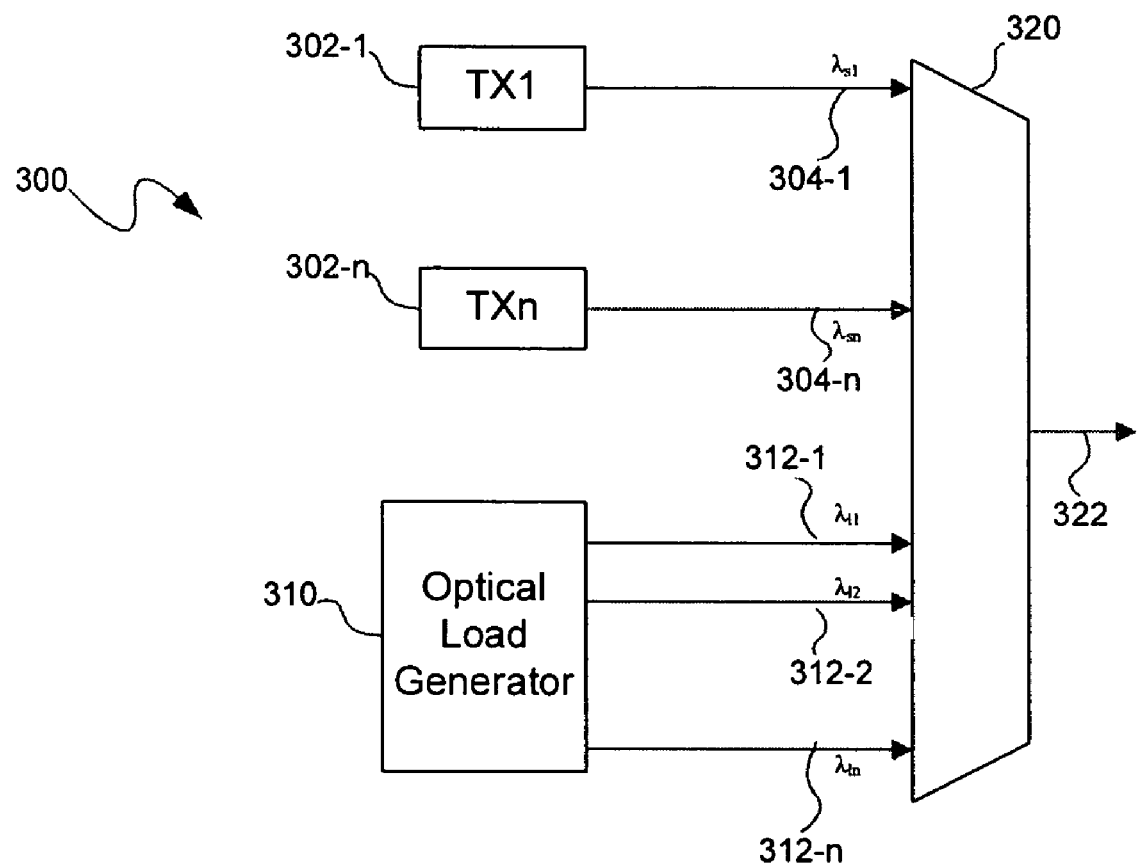
FIG. 3 is a schematic illustration of a system for spectral loading consistent with one embodiment of the present invention.

Referring to FIG. 3, one embodiment of a system 300 for spectral loading is described in greater detail. In general, the system 300 provides the information signals and the dummy tones and combines the information signals and the dummy tones to be carried on an optical transmission path, for example, a fiber in optical communication system 100 (FIG. 1). The optical transmission path may also include one or more optical amplifiers, gain flattening filters, and/or other optical transmission equipment. The system 300 may be used in any WDM system known to those skilled in the art with the information signals provided on utilized channels of the WDM system and the dummy tones provided on unutilized (or idle) channels of the WDM system.

The system 300 may include one or more transmitters 302-1 to 302-n that provide information signals 304-1 to 304-n on different signal wavelengths ($\lambda_{s1}, \ldots \lambda_{sn}$) within a band of system wavelengths. The system wavelengths are generally associated with the separate WDM channels of a WDM system and the signal wavelengths are associated with utilized WDM channels in the WDM system. Each of the transmitters 302-1 to 302-n may include optical transmitting equipment known to those skilled in the art such as, for example, a laser source, modulator and an amplifier.

The system 300 may also include an optical load generator 310 that generates dummy tones 312-1 to 312-n at different loading wavelengths ($\lambda_{l1}, \lambda_{l2}, \ldots \lambda_{sn}$) within the band of system wavelengths. The loading wavelengths generally correspond to a subset of unutilized WDM channels in the system. As described in greater detail below, desired loading wavelengths may be selected based on the gain distortions in the spectrum for a partially loaded WDM system. The optical load generator 310 may include continuous-wave laser sources or a filtered noise source, as will be described in greater detail below.

The system 300 may further include at least one optical combiner 320 that combines the information signals 304-1 to 304-n and the dummy tones 312-1 to 312-n to provide an output 322. The output 322 may be provided to the optically amplified transmission path such that the information signals 304-1 to 304-n are provided on utilized channels and dummy tones 312-1 to 312-n are provided on unutilized channels of the WDM system. Although a single optical combiner is shown, additional optical combiners and/or other such optical devices may be used to combine information signals and dummy tones.

Figure 4:
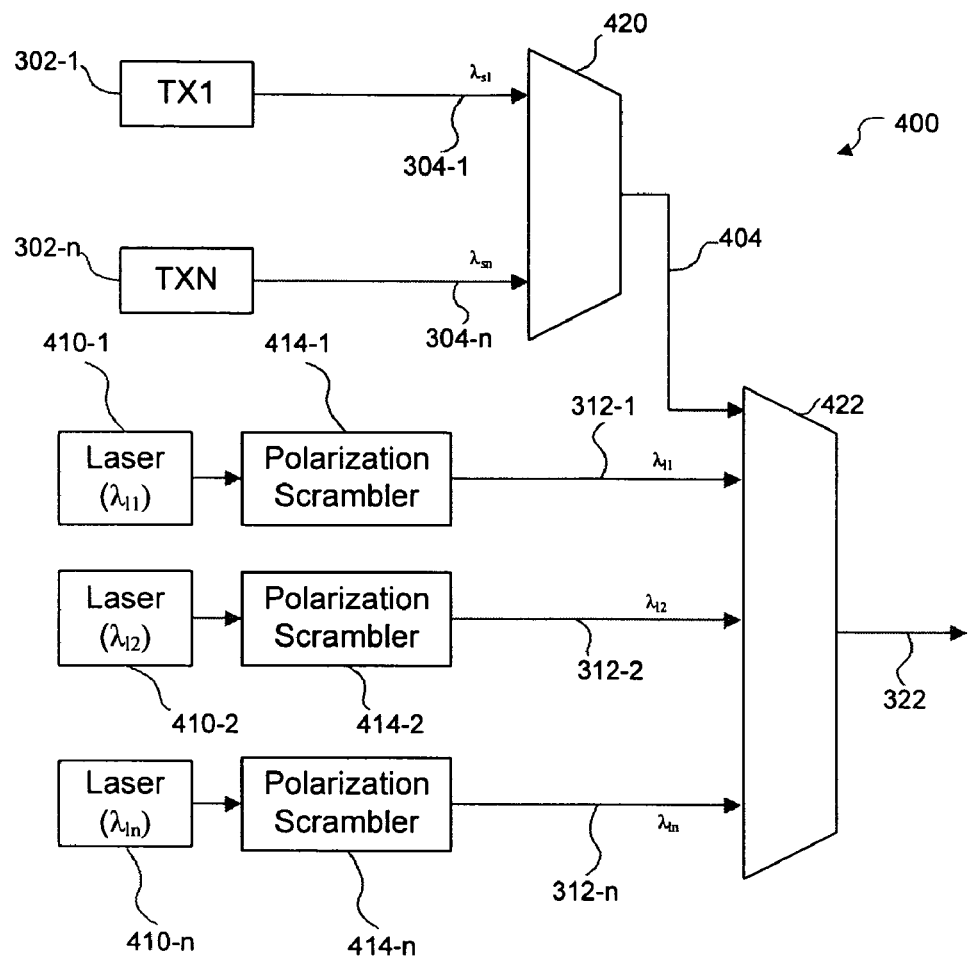
FIG. 4 is a schematic illustration of another embodiment of a system for spectral loading using laser sources.

According to another embodiment of a spectral loading system 400, shown in FIG. 4, a plurality of continuous-wave non-modulated laser sources 410-1 to 410-n are used to generate the dummy tones 312-1 to 312-n at the desired loading wavelengths. The spectral loading system 400 may also include one or more polarization scramblers 414-1 to 414-n following the laser sources 410-1 to 410-n to generate depolarized idler or dummy tones. Alternatively, the continuous-wave non-modulated laser sources 410-1 to 410-n may be used without the polarization scramblers. Laser sources and polarization scramblers known to those skilled in the art may be used.

In this embodiment of the spectral loading system 400, a first optical combiner 420 combines the information signals 304-1 to 304-n into a WDM signal 404. A second optical combiner 422 may then combine the WDM signal 404 and the dummy tones 312-1 to 312-n to provide the output 322. Those of ordinary skill in the art will recognize that the optical combiners may take a variety of configurations and may include passive and/or active devices configured to combine at least portions of each input into a common output.

Figure 5:
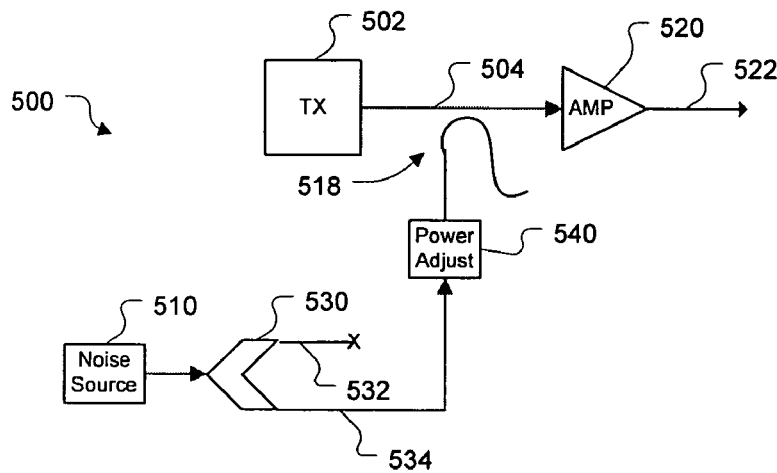
FIG. 5 is a schematic illustration of a further embodiment of a system for spectral loading using a filtered noise source.

According to a further embodiment of the spectral loading system 500, shown in FIG. 5, a broadband noise source 510 and a filter 530 are used to generate dummy noise tones at the desired loading wavelengths. In this embodiment, a transmitter 502 generates a WDM signal 504 including the information signals on the utilized channels. The WDM signal 504 may be coupled to a transmitter amplifier 520 and transmitted on an optically amplified transmission path 522, e.g., a fiber of a transmission line fiber pair. The exemplary system 500 combines the dummy noise tones with the WDM signal 504 such that the noise tones are added on unutilized channels of the WDM signal 504 at the desired loading wavelengths.

The noise source 510 may include a broadband noise source such as an ASE noise source. Those of ordinary skill in the art will recognize that an optical amplifier, such as an EDFA, may be configured as an ASE source by providing a low input power to the amplifier. Also, any unused fiber pairs in the system, or fiber pairs with enough utilized channels for stable operation, may be used as a broadband noise source.

The filter 530 may be configured to separate the broadband noise provided by the noise source 510 into separate noise tones at desired loading wavelengths corresponding to unutilized channels. The filter 530 may be an optical interleaving filter including one or more optical filter elements that filter an input optical signal into one or more outputs including a plurality of discrete spectral bands. One output 532 of the optical interleaving filter may be terminated and the other output 534 of the optical interleaving filter may provide the noise tones. A variety of optical interleaving filter configurations are known to those of ordinary skill in the art. For example, wideband single component optical interleaving filter configurations for providing one or more outputs at common WDM channel separations are known and commercially available. Those of ordinary skill in the art will also recognize that an optical interleaving filter may be constructed from a stack of discrete filter elements.

An output 534 of the filter 530 may be coupled to a power adjustment device 540 to allow adjustment of the power level in the noise tones output from the filter 530. An optical coupler 518 may be used to couple the output of the power adjustment device 540 to a path carrying the WDM signal 504 generated by the transmitter 502 and including the utilized and unutilized channels. The dummy noise tones are thus added on the unutilized channels of the WDM signal 504 at the desired loading wavelengths. The optical coupler 518 may also be coupled to other transmission paths in the optical transmission system. Thus, a single broadband noise source 510 may serve multiple transmission paths (e.g., line pairs) in an optical transmission system.

The power adjustment device 540 may include a variable optical attenuator (VOA) or a dynamic gain equalizer. The power adjustment device 540 may also, or alternatively, be configured as a loss filter for controlling the power level of one or more specific noise tones or bands of noise tones. The power adjustment device 540 may include, for example, a pair of arrayed waveguide gratings (AWGs). One AWG may physically separate the noise tones onto different paths coupled to associated attenuators for specifically attenuating the tone on each path. The other AWG may combine the attenuated noise tones back onto a common path. The power adjustment device 540 may be adjusted to attenuate one or more of the noise tones to maintain an appropriate per-channel power level during transmission through the optically amplified path 522. The level of attenuation imparted by the power adjustment device 540 may depend on system characteristics including the amplifier configurations and the optical interleaving filter configurations.

Those skilled in the art will recognize that other tone control devices (e.g., spectral filters, amplifiers, etc.) may also be used to control characteristics of the noise tones. One example of tone control devices that may be used includes one or more drop or passband filters, e.g., a high finesse Fabry-Perot filter, to limit broadening of the noise tones during transmission.

Those skilled in the art will recognize that other noise sources and configurations for generating noise tones may be used. Examples of different configurations that may be used to provide noise sources and noise tones for loading unutilized channels in a WDM system are described in greater detail in U.S. patent application Ser. No. 10/877,059 filed on Jun. 25, 2004, which is fully incorporated herein by reference.

According to one method of spectral loading to suppress SHB, a distortion caused by SHB is identified in the gain spectrum for a partially loaded WDM system. The distortion is generally an alteration of the gain shape from the relatively flat gain shape for a fully loaded WDM system. As shown in FIGS. 2A-2C, the distortion will depend on the loading configuration of the partially loaded WDM system.

The desired loading wavelengths for the dummy tones may be selected based on the identified distortion in the gain spectrum for the partially loaded WDM system. In one embodiment, three or more loading wavelengths associated with unutilized WDM channels are selected. The loading wavelengths may be spaced within the band of system wavelengths (or WDM system channels) to suppress the effects of SHB on the partially loaded WDM system. The dummy tones may be located in the optical band at frequencies such that the combination of the holes created by the dummy tones through SHB generates a relatively flat power spectrum. A relatively flat power spectrum is close to the power spectrum obtained through a full loading configuration with close modulated channels (e.g., 64 channels at 10 Gb/s) covering the entire optical band of the amplifiers in the system.

The dummy tones may then be imparted on the selected unutilized channels of the WDM system to change the distortion and provide a desired gain spectrum (e.g., closer to the spectrum for a fully loaded system) for the WDM system. The performance or bit error ratio (BER) of the traffic-conveying or utilized channels may also be optimized by adjusting the power of the dummy tones or equivalently the ratio (i.e., the power of the individual dummy tone divided by the power of the individual channel).

Figure 6:
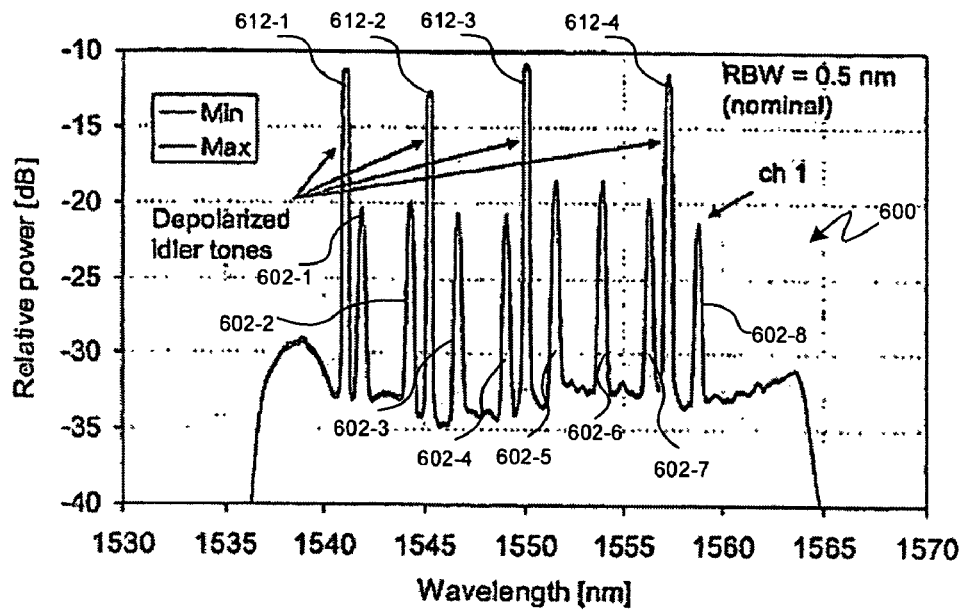
FIG. 6 is a graphical illustration of a received optical spectrum for an eight (8) channel loading configuration using an exemplary method of spectral loading consistent with one embodiment of the present invention.

A received optical spectrum 600 according to one example of spectral loading is illustrated in FIG. 6. According to this example, a WDM system is loaded with four (4) idler or dummy tones 612-1 to 612-4 to equalize the power spectrum for eight (8) modulated or utilized channels 602-1 to 602-8. The exemplary WDM system may be an undersea optical communication system such as the Tyco Global Network (TGN), which uses a CRZ modulation format with a 7.6 dB SBS and +0.75 rad PM and has a launched data channel power of −3.1 dBm. The bandwidth of the exemplary WDM system is 1537.6 nm to 1563.2 nm (wavelengths expressed in a vacuum). According to the exemplary spectral loading configuration, the four dummy tones 612-1 to 612-4 use center wavelengths of 1541 nm, 1545.3 nm, 1550.1 nm and 1557.4 nm, respectively.

Figure 7:
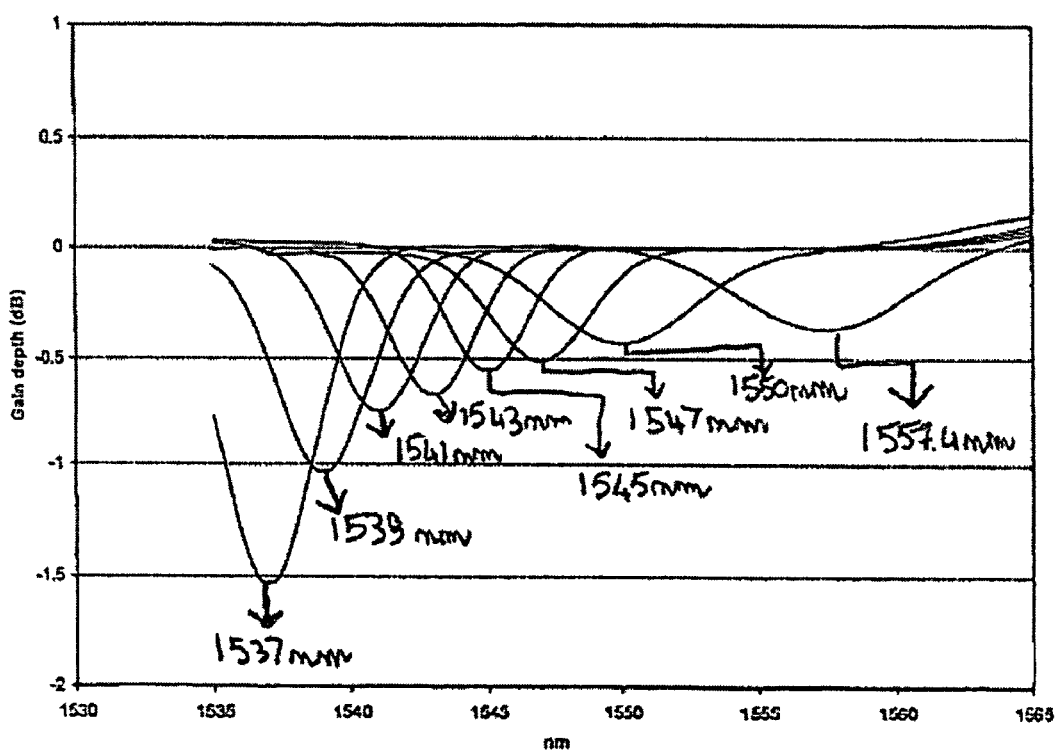
FIG. 7 is a graphical illustration of the varying width and depth of a spectral hole generated by a single saturating tone as a function of the wavelength of the saturating tone.

In the example shown in FIG. 6, the majority of the dummy tones are used below the 1550 nm wavelength because the width of the holes created by the SHB effect decreases with decreasing wavelength. FIG. 7 illustrates the width and depth of the holes created by saturating tones at specified wavelengths with the same power being used for each saturating tone. As shown, the width and depth of the hole created by the SHB effect varies as a function of the wavelength of a saturating tone, when all the power at the input is at the wavelength of the saturating tone. At shorter wavelengths, the hole or gain depression is deeper and the width is smaller.

The overall gain/noise spectra reflects holes that are a combination of the contributions of each individual dummy tone. Accordingly, the dummy tones may be located such that a majority of the dummy tones are used in the shorter wavelengths to suppress the SHB effects and to alter the power spectrum.

Figure 8:
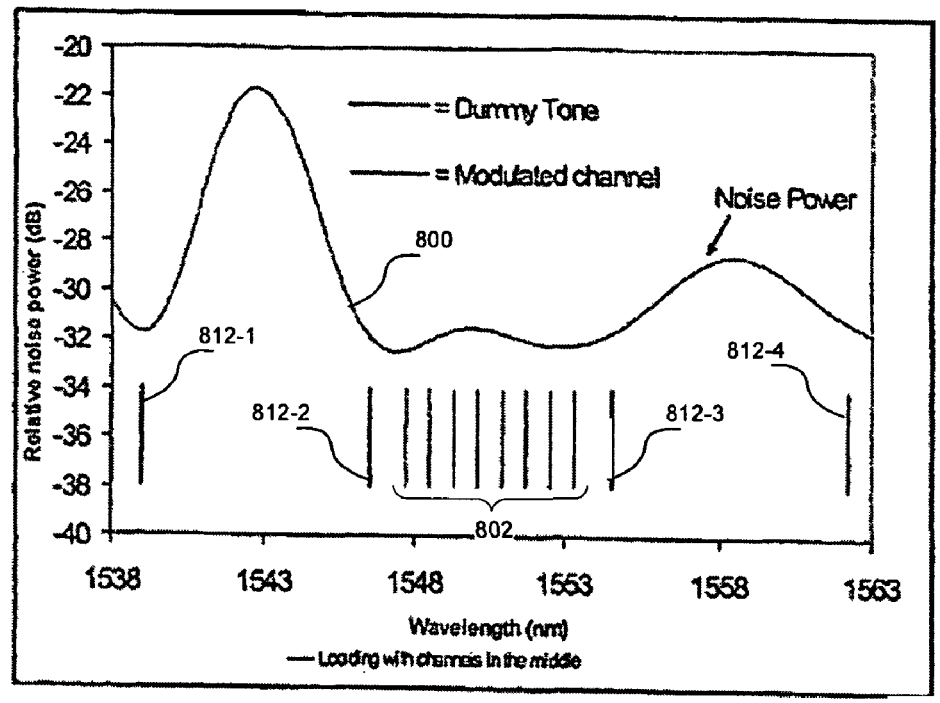
FIG. 8 is a graphical illustration of a gain/noise spectrum for an exemplary WDM system using one spectral loading configuration.
Figure 9:
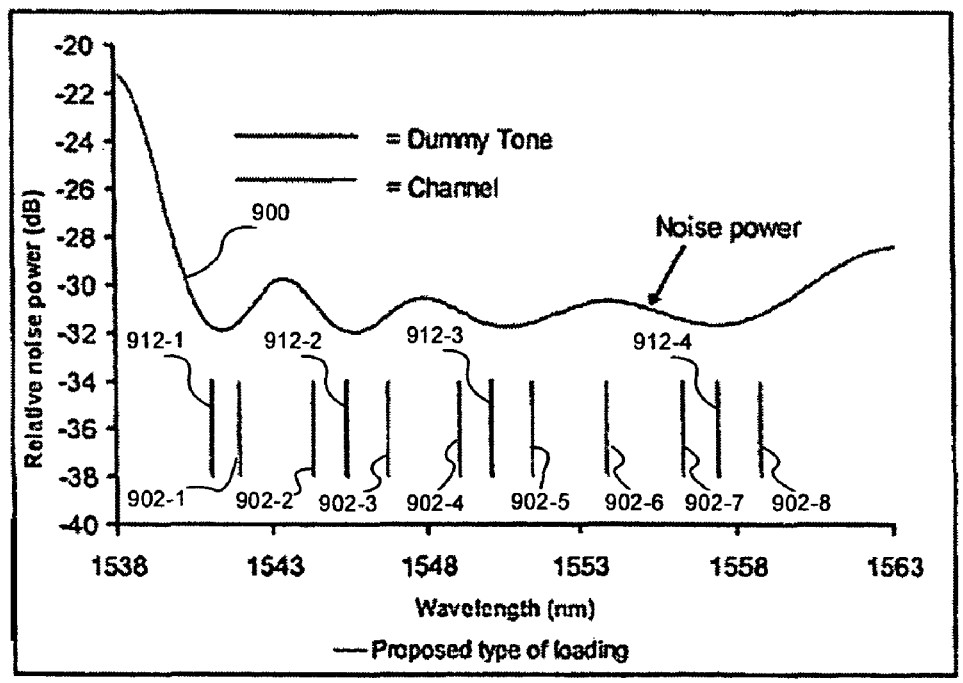
FIG. 9 is a graphical illustration of a gain/noise spectrum for an exemplary WDM system using another spectral loading configuration.

FIGS. 8 and 9 show the gain/noise spectra 800, 900 for two different examples of spectral loading using dummy tones in an exemplary WDM system. The WDM system in these spectral loading examples includes 200 amplifiers with a repeater gain of 10.6 dB and each repeater including a gain flattening filter. The gain of this exemplary WDM system (i.e., end to end) is nominally flat with dense full loading, e.g., 270 evenly spaced channels from 1537 nm to 1564 nm with a step of 0.1 nm. As shown, however, the exemplary WDM system is only partially loaded with eight (8) utilized or modulated channels.

In the example shown in FIG. 8, four (4) dummy tones 812-1 to 812-4 are located outside of the band of eight (8) utilized channels 802 in the exemplary WDM system. Although this spectral loading example may suppress some SHB effects, it does not adequately control the noise power at the ends of the system across the band of interest (i.e., 1538 nm to 1563 nm).

In the example shown in FIG. 9, four (4) dummy tones 912-1 to 912-4 are located unevenly across the band of eight (8) utilized channels 902-1 to 902-8 in the exemplary WMD system to provide better control of the noise power spectrum and the gain spectrum. In this example, one dummy tone 912-3 is located in the middle of the passband or band of system wavelengths, two dummy tones 912-1, 912-2 are located at wavelengths below the middle dummy tone 912-3, and one dummy tone 912-4 is located at a wavelength above the middle dummy tone 912-3. As a result, the spectrum is altered and improved in the range between the most external dummy tones, i.e., between 1540 nm and 1558 nm.

Accordingly, one method of spectral loading includes selecting one loading wavelength at the middle of the passband. At least two other loading wavelengths may then be located such that the combination of the holes created by the dummy tones through SBH generates a relatively flat power spectrum, as compared to a fully loaded WDM system. Although the exemplary embodiment provides a desired gain spectrum that is closer to the spectrum for a fully loaded system (e.g., relatively flat), the spectral loading system and method may also be used to achieve other desired gain spectrums.

The channel counts (i.e., the number of utilized channels) in a WDM system may be increased to accommodate increased capacity demands. As utilized channels are added to the system, the spectral loading with dummy tones may be changed based on the new loading configuration for the utilized channels. For example, dummy tones may be added or removed and/or the loading wavelengths of the dummy tones may be changed depending upon the new gain spectrum for the new loading configuration.

Accordingly, the spectral loading system and method may be used to suppress SHB effects in a partially loaded WDM system. The spectral loading system and method may thus be used to alter distortions in gain shape to provide a desired gain spectrum, for example, more similar to a fully loaded WDM system.

Consistent with one embodiment, a system includes at least one transmitter configured to transmit information signals on different respective signal wavelengths within a band of system wavelengths associated with channels of a wavelength division multiplex (WDM) system. The system also includes an optical load generator configured to generate dummy tones at loading wavelengths within the band of system wavelengths, and the loading wavelengths are associated with a subset of unutilized channels in the WDM system. At least one combiner is configured to combine the information signals and the dummy tones to provide an output including the information signals on utilized channels of the WDM system and the dummy tones on the subset of unutilized channels of the WDM system.

Consistent with another embodiment, a method is provided for transmitting a WDM signal on an optical transmission path. The method includes generating a plurality of information signals at different respective signal wavelengths within a band of system wavelengths associated with channels of a partially loaded WDM system. Dummy tones are generated loading wavelengths within the band of system wavelengths, and the loading wavelengths are associated with a subset of unutilized channels in the WDM system. The information signals and the dummy tones are imparted on the optical transmission path such that the information signals are provided on utilized channels of the WDM system and the dummy tones are provided on the subset of unutilized channels of the WDM system.

Consistent with a further embodiment, a method of spectral loading is provided to suppress spectral hole burning. The method includes identifying a distortion in a gain spectrum for a partially loaded WDM system including utilized and unutilized channels across a band of system wavelengths. Loading wavelengths are selected within a band of system wavelengths based on the distortion in the gain spectrum for the WDM system. The loading wavelengths correspond to a subset of unutilized channels in the WDM system. Dummy tones are imparted at the loading wavelengths on the unutilized channels in the WDM system to change the distortion and provide a desired gain spectrum for the WDM system.

The embodiments that have been described herein, however, are but some of the several which utilize this invention and are set forth here by way of illustration but not of limitation. Any particular configuration described herein may be combined with one or more other configurations described herein to construct a system consistent with the invention. Many other embodiments, which will be readily apparent to those skilled in the art, may be made without departing materially from the spirit and scope of the invention as defined in the appended claims.

What is claimed is:

1. A system comprising:
   at least one transmitter configured to transmit information signals on different respective signal wavelengths within a band of system wavelengths associated with channels of a wavelength division multiplex (WDM) system;
   an optical load generator configured to generate dummy tones at loading wavelengths within said band of system wavelengths, wherein said loading wavelengths are associated with only a subset of unutilized channels in said WDM system and a majority of said loading wavelengths are within a lower half of said band of system wavelengths, said unutilized channels being channels of said WDM system that are not initially loaded with one of said information signals, and wherein said loading wavelengths are selected and spaced to provide a flattened gain spectrum across said band of system wavelengths compared to the gain spectrum of said system without said loading wavelengths; and
   at least one combiner configured to combine said information signals and said dummy tones to provide an output comprising said information signals on utilized channels of the WDM system and said dummy tones on said subset of unutilized channels of the WDM system.

2. The system of claim 1, wherein said loading wavelengths are selected and spaced based on a distortion in a gain spectrum for a partially loaded WDM system.

3. The system of claim 1, wherein said optical load generator is configured to generate at least three dummy tones.

4. The system of claim 1, wherein a majority of said dummy tones are generated at wavelengths below about 1550 nm.

5. The system of claim 1, wherein one of said dummy tones is generated at a wavelength in the middle of said band of system wavelengths.

6. The system of claim 1, further comprising at least one power adjustment device coupled to at least said optical load generator and configured to adjust a power level of said dummy tones.

7. The system of claim 1, wherein said optical load generator comprises continuous wave laser sources configured to operate at said loading wavelengths.

8. The system of claim 7, wherein said optical load generator further comprises at least one polarization scrambler coupled to said laser sources.

9. The system of claim 1, wherein said optical load generator comprises: a broadband noise source configured to generate optical noise; and at least one filter configured to filter said optical noise to produce said dummy tones.

10. The system of claim 9, wherein said noise source comprises an amplified spontaneous emission (ASE) noise source.

11. The system of claim 1, further comprising an optically amplified transmission line coupled to said output of said at least one combiner.

12. A method of transmitting a WDM signal on an optical transmission path, said method comprising:
   generating a plurality of information signals at different respective signal wavelengths within a band of system wavelengths associated with channels of a partially loaded WDM system;
   generating dummy tones at loading wavelengths within said band of system wavelengths, wherein said loading wavelengths are associated with only a subset of unutilized channels in said WDM system and a majority of said loading wavelengths are within a lower half of said band of system wavelengths, said unutilized channels being channels of said WDM system that are not initially loaded with one of said information signals, and wherein said loading wavelengths are selected and spaced to provide a flattened gain spectrum across said band of system wavelengths compared to the gain spectrum of said system without said loading wavelengths; and imparting said information signals and said dummy tones on said optical transmission path such that said information signals are provided on utilized channels of said WDM system and said dummy tones are provided on said subset of unutilized channels of said WDM system.

13. The method of claim 12, further comprising selecting said loading wavelengths based on a distortion in a gain spectrum for said partially loaded WDM system.

14. The method of claim 12, wherein generating said dummy tones comprises generating at least three dummy tones.

15. The method of claim 12, wherein generating said dummy tones comprises generating a majority of said dummy tones at wavelengths below about 1550 nm.

16. The method of claim 12, wherein generating said dummy tones comprises generating at least three noise tones.

17. The method of claim 12, wherein generating said dummy tones comprises filtering an amplified spontaneous emission (ASE) noise source to generate at least three noise tones.

18. A method of spectral loading to suppress spectral hole burning, said method comprising:

identifying a distortion in a gain spectrum for a partially loaded WDM system including utilized and unutilized channels across a band of system wavelengths, each of said utilized channels having an associated information signal loaded thereon;

selecting loading wavelengths within said band of system wavelengths based on said distortion in said gain spectrum for said WDM system, said loading wavelengths associated with some of said unutilized channels in said WDM system and a majority of said loading wavelengths being within a lower half of said band of system wavelengths, said unutilized channels being channels of said WDM system that are not initially loaded with one of said information signals; and imparting dummy tones at said loading wavelengths only on a subset of said unutilized channels in said WDM system to change said distortion and provide a flattened gain spectrum across said band of system wavelengths compared to the gain spectrum of said system without said loading wavelengths.

19. The method of claim 18, wherein selecting said wavelengths includes selecting at least three wavelengths for generating at least three dummy tones.

20. The method of claim 18, wherein selecting wavelengths includes selecting loading wavelengths unevenly spaced across said band of system wavelengths.

21. The method of claim 18, wherein selecting loading wavelengths includes selecting one of said loading wavelengths in the middle of said band of system wavelengths.

22. The method of claim 18, wherein selecting loading wavelengths includes selecting a majority of said loading wavelengths below about 1550 nm.

* * * * *